United States Patent
Bigge et al.

(10) Patent No.: US 8,310,159 B2
(45) Date of Patent: Nov. 13, 2012

(54) LIGHTING SYSTEM HAVING PHOTOCONTROL AND FAULT MONITORING CAPABILITIES

(75) Inventors: William Joseph Bigge, Newnan, GA (US); Daniel Leland Bragg, Peachtree City, GA (US); Li Li, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 329 days.

(21) Appl. No.: 12/768,142

(22) Filed: Apr. 27, 2010

(65) Prior Publication Data

US 2011/0260624 A1 Oct. 27, 2011

(51) Int. Cl.
*H01J 7/24* (2006.01)
(52) U.S. Cl. .................. 315/119; 315/149; 315/150
(58) Field of Classification Search ............ 315/119, 315/149, 150, 152, 307; 307/117; 250/205, 250/206
See application file for complete search history.

(56) References Cited

U.S. PATENT DOCUMENTS

| | | | |
|---|---|---|---|
| 5,195,016 A * | 3/1993 | Powers ................... | 361/175 |
| 6,028,396 A | 2/2000 | Morrissey et al. | |
| 6,097,302 A | 8/2000 | Zinzell | |
| 6,452,339 B1 | 9/2002 | Morrissey et al. | |
| 6,841,944 B2 * | 1/2005 | Morrissey et al. ....... | 315/119 |
| 2008/0147337 A1 | 6/2008 | Walters et al. | |
| 2009/0261660 A1 * | 10/2009 | Flaherty ................. | 307/117 |
| 2010/0097122 A1 * | 4/2010 | Flaherty ................. | 327/514 |

* cited by examiner

*Primary Examiner* — Vibol Tan
(74) *Attorney, Agent, or Firm* — King & Spalding LLP

(57) ABSTRACT

A photocontroller operates one or more lamps, such as a GU24 compact fluorescent lamp, based on ambient light to provide dusk-to-dawn operation. The photocontroller includes a photosensor for detecting the level of ambient light. The photosensor provides a signal to a photocontrol circuit that controls a switching device to selectively provide power to the lamp based on the level of ambient light detected by the photosensor. A fault detection circuit monitors the level of ambient light and the status of the lamp to determine whether the photocontroller is operating properly. The fault detection circuit determines the status of the lamp based on current flow to the lamp as determined by a current sensor. In addition, the photocontroller can include a processor for performing certain photocontrol and fault monitoring functions.

30 Claims, 9 Drawing Sheets

LIGHTING SYSTEM HAVING PHOTOCONTROL AND FAULT MONITORING CAPABILITIES

TECHNICAL FIELD

The invention relates generally to lighting and more particularly to a lighting system having a photocontrol circuit for operating a light source based on ambient light and fault monitoring capabilities.

BACKGROUND

Photocontrollers are employed in certain lighting systems to activate a light when ambient light is low and to deactivate the light when ambient light is sufficient. For example, a photocontroller for use with an outside light may turn on a light at night and turn off the light during the day. Controlling a light in such fashion can reduce the amount of energy consumed by the light and, in turn, reduce energy costs for the lighting provider.

However, if the photocontroller or a component thereof fails, power may be provided to the light continuously even during sufficient lighting conditions. For example, a relay used to switch the light on and off may fail in a closed position, or, a sensor used to detect ambient light may fail in a state that provides an indication of night or insufficient lighting continuously. If left undetected, these faults can result in large amounts of wasted energy.

Alternatively, a component of the photocontroller may fail in a position that results in the light never being activated. The relay used to switch the light on and off may fail in an open position or a sensor used to detect ambient light may fail in a state that provides an indication of daylight or sufficient lighting. This may result in a safety hazard.

SUMMARY

The present invention provides a lighting system having photocontrol and fault monitoring capabilities. The lighting system can include a photocontroller for operating one or more lamps, such as a GU24 compact fluorescent lamp, based on ambient light to provide dusk-to-dawn operation. The photocontroller can include a photosensor, such as a photocell, for detecting the level of ambient light. The photosensor provides a signal to a photocontrol circuit that can control a switching device to selectively provide power to the lamp based on the level of ambient light detected by the photosensor. A fault detection circuit monitors whether the lamp should be activated based on ambient light and the status of the lamp to determine whether the photocontroller is operating properly. The fault detection circuit can determine the status of the lamp based on current flow to the lamp.

One aspect of the present invention provides a lighting circuit for operating a GU24 compact fluorescent lamp. This lighting circuit includes a photosensor for detecting ambient light levels and for generating an ambient light signal including an indication of the level of ambient light. A relay disposed between a power source and the lamp can selectively allow the power source to provide power to the lamp. The lighting circuit also includes a photocontrol circuit electrically coupled to the relay and to the photosensor. The photocontrol circuit can receive the ambient light signal from the photosensor, determine whether the level of ambient light is below an activation threshold, and in response to the level of ambient light being below the activation threshold, cause the relay to allow power from the power source to the lamp. A fault detection circuit can monitor for faults in the lighting circuit by comparing whether power should be provided to the lamp based on the level of ambient light and whether power is actually being provided to the lamp.

Another aspect of the present invention provides a lighting circuit including a GU24 compact fluorescent lamp and a photocontroller for selectively providing power to the lamp from a power source. This photocontroller can include a relay having a set of relay contacts disposed between the power source and the lamp and a photosensor for detecting ambient light levels and for generating an ambient light signal comprising an indication of the level of ambient light. The photocontroller also can include a processor. The processor can receive the ambient light signal from the photosensor and determine whether the level of ambient light exceeds a deactivation threshold. Based on a determination that the level of ambient light exceeds the deactivation threshold, the processor can provide a signal to the relay to cause the relay contacts to open and block power from reaching the lamp. The processor also can determine whether power is being provided to the lamp and determine that a fault exists if power is being provided to the lamp when the level of ambient light exceeds the deactivation threshold.

Another aspect of the present invention provides a lighting circuit including a lamp and a switching mechanism disposed between the lamp and a power source for allowing the power source to activate the lamp upon receipt of a command signal. A photosensor can detect ambient light levels and adjust a voltage level in response to the level of ambient light detected. A voltage comparator can include a first input for receiving the voltage level, a second input coupled to a reference voltage, and an output coupled to the switching mechanism. The voltage comparator can provide the command signal to the switching mechanism in response to the voltage level indicating a low level of ambient light based on a comparison of the voltage level with the reference voltage. A fault detection circuit can detect that a fault is present in the lighting circuit when the command signal is not provided to the switching mechanism by the voltage comparator and power is being provided to the lamp.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description in conjunction with the accompanying drawings in which.

Figure 1:
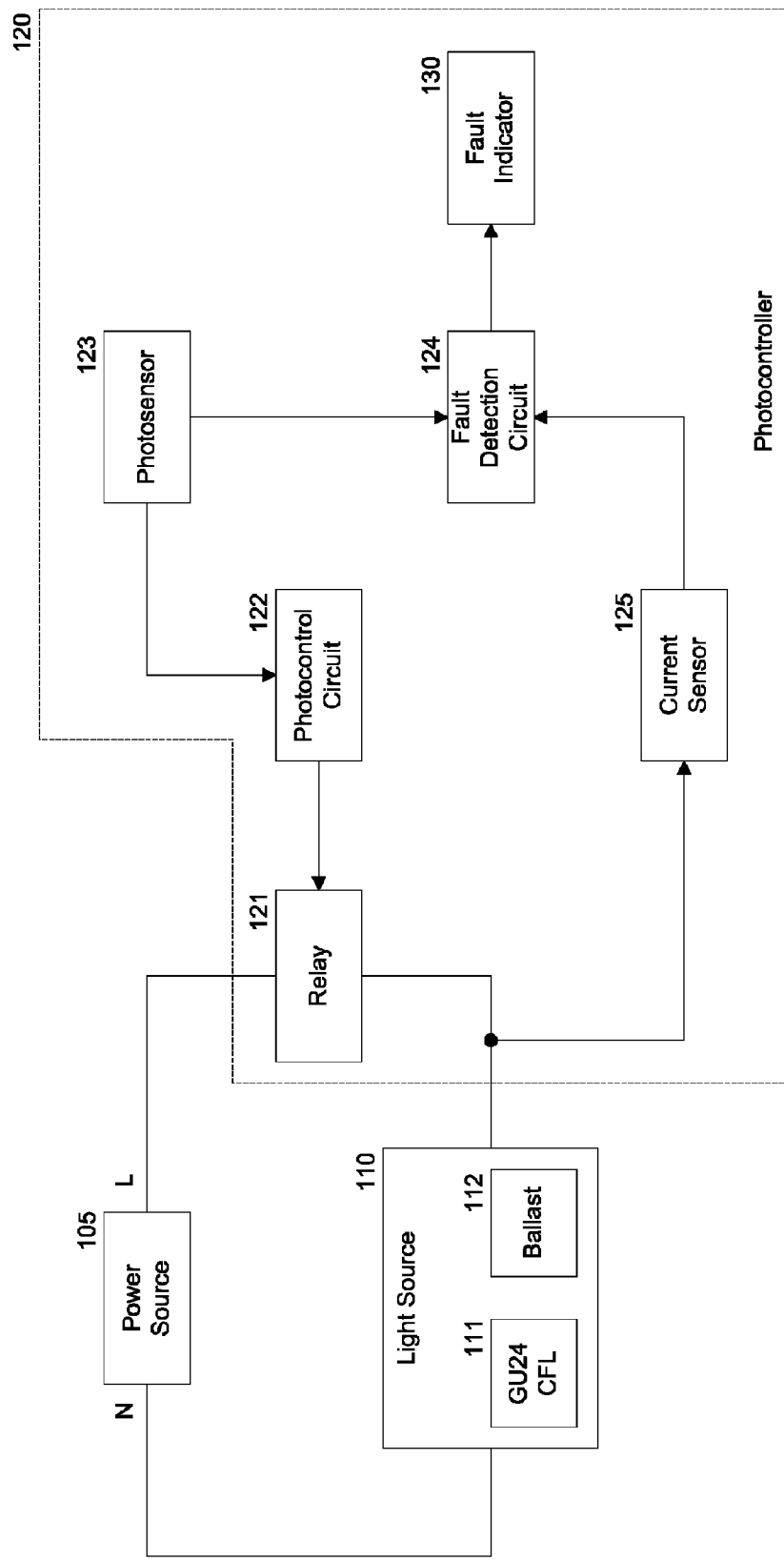
FIG. 1 is a block diagram depicting a lighting system with photocontrol and fault detection capabilities, in accordance with certain exemplary embodiments.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements.

DETAILED DESCRIPTION OF EXEMPLARY EMBODIMENTS

In one exemplary embodiment, a lighting system described herein provides dusk-to-dawn operation for a one or more lamps. In particular, the exemplary embodiments provide a photocontrol circuit for operating a light source based on ambient light. In certain exemplary embodiments, the photocontrol circuit includes one or more photosensors, such as a photocell, that detect the level of ambient light in an area where the light source is located. Ambient light may originate from natural light, such as sunlight, or from other artificial light sources. The exemplary photocontrol circuit operates a switching device, such as a relay, to selectively provide power to the light source based on the level of ambient light detected by the photosensor. For example, the photocontrol circuit activates the light source when the level of ambient light falls below a threshold and deactivates the light source when the level of ambient light exceeds a threshold.

The lighting system also includes a fault monitoring circuit for detecting faults or malfunctions in the photocontrol circuit. A fault in the photocontrol circuit may exist if the light source is activated at a time when the level of ambient light is sufficient. A fault in the photocontrol circuit also may exist if the light source is deactivated at a time when the level of ambient light is insufficient. In one exemplary embodiment, the fault detection circuit typically monitors the level of ambient light using a photosensor, such as the photosensor employed by the photocontrol circuit or a second photosensor. The exemplary fault detection circuit also determines whether the light source is activated by determining, for example, whether electrical power is being provided to the light source. For example, the fault detection circuit may include or be coupled to a current sensor that measures the amount of electrical current flowing to the light source.

Turning now to the drawings, in which like reference numerals refer to like (but not necessarily identical) elements, exemplary embodiments are described in detail. FIG. 1 is a block diagram depicting a lighting system 100 with photocontrol and fault detection capabilities, in accordance with certain exemplary embodiments. Referring to FIG. 1, the exemplary lighting system 100 includes a power source 105 that is electrically connected to and provides power to a light source 110 via a photocontroller 120.

In the exemplary embodiment, the light source 110 includes a GU24 compact fluorescent lamp ("CFL") 111 and a ballast 112 for controlling electrical current to the lamp 111. The term "GU24" generally refers to a standardized line voltage socket that couples a lamp to a lamp base. The socket includes two electrically conductive pins that engage slots in a lamp base via a simple twist and lock procedure. That is, each pin of the socket is inserted into one of the slots of the lamp base and the socket is twisted (relative to the base) into a locking position. This twist and lock procedure allows for easy lamp replacement. Although the ballast is shown as a separate component in FIG. 1, in alternative exemplary embodiments, the light source 110 includes a self-ballasted GU24 lamp. In another exemplary embodiment, the light source 110 includes multiple GU24 CFLs 111 or other types of lamps, including, but not limited to, fluorescent, incandescent, light emitting diode ("LED"), or high intensity discharge ("HID").

The photocontroller 120 includes a relay 121 disposed between the power source 105 and the light source 110 to selectively provide power to the light source 110. The relay 121 is electrically coupled to a photocontrol circuit 122 via one or more electrical conductors. The photocontrol circuit 122 includes circuitry for operating the relay 121 based on ambient light. For example, the photocontrol circuit 122 activates the relay 121 to provide power to the light source at night and deactivate the relay 121 to remove power from the light source 110 during the day to conserve energy when the light source 110 is not needed.

The photocontrol circuit 122 is electrically coupled to one or more photosensors, such as photosensor 123. In one exemplary embodiment, the photosensor 123 is installed in the area that the light source 110 is installed to detect the level of ambient light in that area. For example, the photosensor 123 is installed on a light fixture housing the GU24 CFL 111. The exemplary photosensor 123 alternatively provides or is included in a circuit that provides a signal indicative of the level of ambient light to the photocontrol circuit 122.

The exemplary photosensor 123 includes a photocell, photoresistor, photodiode, phototransistor, photoFET, or any other device that is used to sense or detect light levels. For example, the photosensor 123 includes a voltage divider network having a photocell disposed therein to generate a voltage level corresponding to the level of ambient light detected by the photocell. The resistance of a photocell changes according to the level of light sensed by the photocell. Typically, a high resistance indicates a nighttime or low ambient light state and a low resistance indicates a daytime or sufficient ambient light state.

In an exemplary embodiment that employs a photocell as the photosensor 123, the variable resistance of the photocell causes a change in voltage levels in a voltage divider network and the photocontrol circuit 122 is electrically coupled to a node in the voltage divider network to sense this change in voltage. In one example, the photocontrol circuit 122 compares this voltage level to one or more thresholds to determine whether to activate or deactivate the light source 110. For example, the photocontrol circuit 122 activates the light source 110 (by closing the relay 121) when the voltage level exceeds a threshold and deactivates the light source 110 (by opening the relay 121) when the voltage level is below a threshold. The thresholds for activating and deactivating the light source 110 may be the same or different. For example, in one embodiment there is a voltage range between the activation threshold and the deactivation threshold to eliminate any flickering caused by an unstable voltage level.

The photocontroller 120 also includes a fault detection circuit 124 for monitoring for photocontroller 120 faults. In one exemplary embodiment, the fault detection circuit 124 detects faults in the photocontroller 120 by comparing the status of the light source 110 (i.e., whether the light source 110 is on or off) to the state that the light source 110 should be in with respect to the level of ambient light. For example, a fault may be present in the photocontroller 120 if the light source is activated when there is a sufficient level of ambient light. There also may be a fault in the photocontroller 120 if the light source 110 is not activated although there is an insufficient level of ambient light.

In the exemplary embodiment of FIG. 1, the fault detection circuit 124 is coupled to the photosensor 123 to receive a signal indicative of the level of ambient light. In alternative embodiments, the fault detection circuit 124 is coupled to a second photosensor (not shown) for detecting the level of ambient light. The fault detection circuit 124 is also coupled to a current sensor 125. The current sensor 125 detects whether electrical current is flowing to the light source 110 and/or the level of electrical current flowing to the light source 110. The current sensor 125 provides a signal to the photocontrol circuit 125 indicating whether current if flowing between the power source 105 and the light source 110 and/or a signal indicating the amount of current flowing. If current is flowing or the current exceeds a threshold, the fault detection circuit 124 concludes that the light source 110 is activated.

If the fault detection circuit 124 determines that a fault condition is present, the fault detection circuit 124 activates a fault indicator 130 to signal that a fault is present. In certain exemplary embodiments, the fault indicator 130 includes a visible display, such as an LED, or an audible indicator, such as a speaker. For example, a light fixture housing the GU24 CFL 111 may include an LED attached thereto for indicating that a fault is detected. In certain exemplary embodiments, the photocontroller 120 includes a reset button (not shown) that allows a person to reset the fault and thus deactivate the fault indication. After a fault is detected, the fault detection circuit 124 latches in the fault indication until the reset button is engaged. Alternatively, the fault indication circuit 124 may indicate faults by deactivating a fault indicator 130 and indicate normal operation by activating the fault indicator 130. For example, an LED may be illuminated to indicate normal operation and turned off to indicate a fault.

Figure 2:
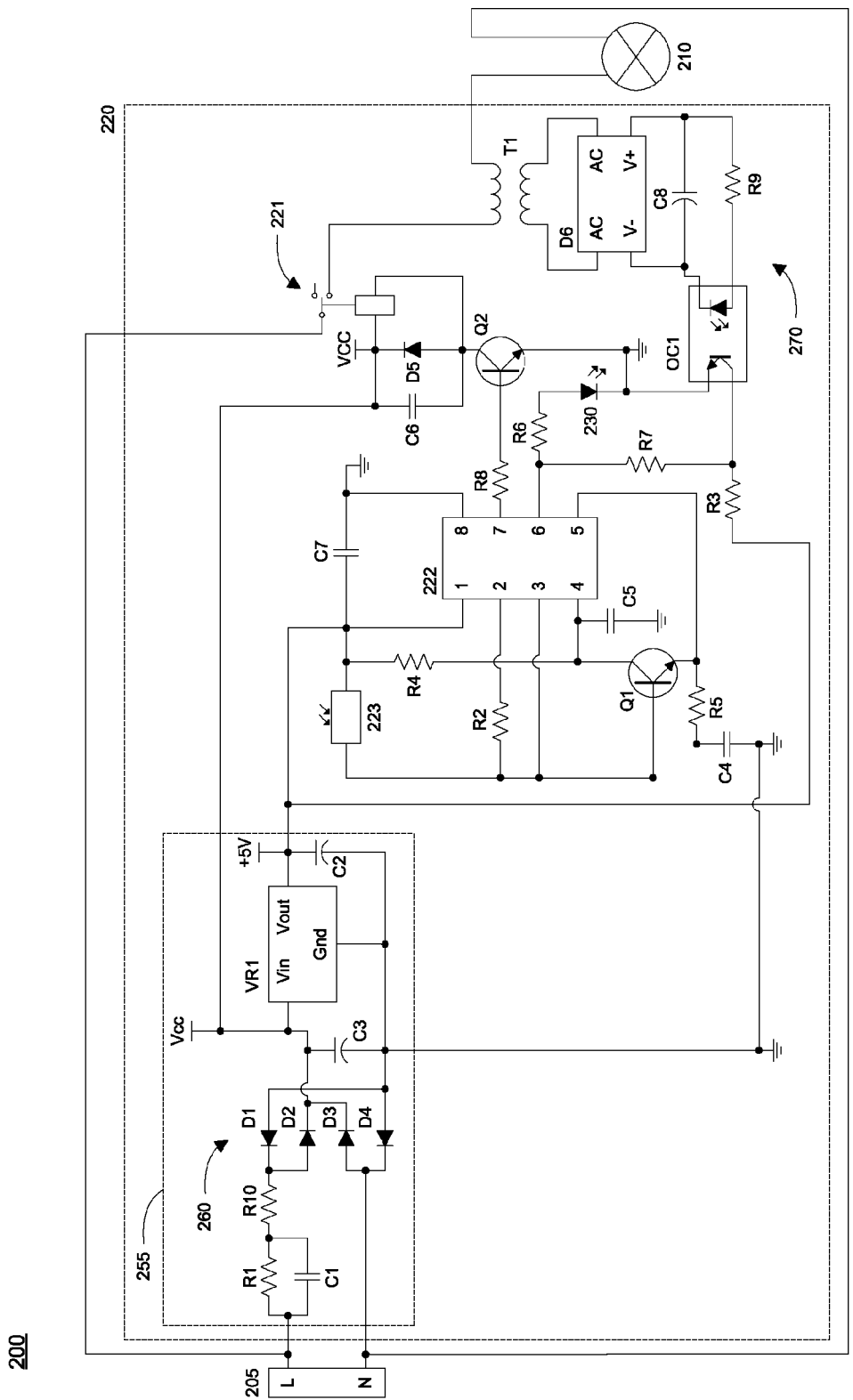
FIG. 2 is a circuit diagram of a lighting circuit with photocontrol and fault detection capabilities, in accordance with certain exemplary embodiments.

FIG. 2 is a circuit diagram of a lighting circuit 200 with photocontrol and fault detection capabilities, in accordance with certain exemplary embodiments. Referring now to FIG. 2, the exemplary lighting circuit 200 includes a photocontroller 220 having a processor 222 for performing many of the functions of the photocontrol circuit 122 and fault detection circuit 124 discussed above with reference to FIG. 1. In certain exemplary embodiments, the processor 222 includes a microprocessor, microcontroller, computer, state machine, programmable device, or other appropriate technology. The exemplary processor 222 can include onboard memory or be coupled to a memory storage device to store data received from various components of the photocontroller 220.

The photocontroller 220 selectively provides electrical power from a power source 205 to a light source 210, based on ambient light. Although not shown, in certain exemplary embodiments, the light source 210 includes a GU24 CFL and a ballast or a self-ballasted GU24 CFL. The GU24 CFL is powered by a 120 VAC power source 205, such as those provided within a residential or commercial installation.

The photocontroller 220 includes a power supply 255 for converting an input AC voltage provided by the power source 205 to a DC voltage suitable for other components of the photocontroller 220. For example, in the exemplary embodiment of FIG. 2, the power supply 255 provides a +5 VDC supply voltage. The power supply 255 includes a full-wave rectifier 260 that converts an input AC voltage to a DC voltage, Vcc. The converted DC voltage Vcc is routed to a voltage regulator VR1 that maintains a continuous, steady +5 VDC supply voltage for the components of the photocontroller 220.

The photocontroller 220 also includes a relay 221 disposed between a line node of the power source 205 and the light source 210. The relay 221 is used to open or close the circuit between the power source 205 and the light source 210 to selectively provide power to the light source 210. The relay 221 is electrically connected to terminal 7 of the processor 222 by way of a transistor Q2 and a resistor R8. To turn the light source 210 on, the processor 222 provides a bias current to the base of the transistor Q2 to allow current to flow through a coil of the relay 221. The current flowing through the coil causes the relay's contacts to close and allow current to flow to the light source 210. The processor 222 turns the light source 210 off by removing the bias current from the base of the transistor Q2, which allows the relay's contacts to open and block current from flowing to the light source 210.

The exemplary photocontroller 220 also includes a photocell 223 for detecting ambient light in an area that the light source 210 is installed or otherwise located. The photocell 223 is disposed between a +5 VDC power source and terminals 2-4 of the processor 222. When the photocell 223 is working properly, the photocell 223 has a variable resistance that changes according to the amount of light sensed by the photocell 223. Typically, this resistance increases with a decrease in light detected. The variable resistance of the photocell 223 causes a variable voltage drop between the +5 VDC power supply and each of pins 2-4 of the processor 222. However, if the photocell 223 is not working properly, for example if the photocell 223 has an electrical short or open, the voltage at these terminals will typically remain constant. For example, if the photocell 223 has a short, the voltage at terminal 3 of the processor 222 would be approximately +5 VDC. Thus, a continuous +5 VDC detected at terminal 3 for a certain time period, for example 24 hours, would be a potential indicator that the photocell 223 has a short-type fault. If the photocell 223 is held open, then the voltage detected at each of terminals 2 and 3 of the processor 222 would be approximately zero volts. Thus, a continuous lack of voltage at each of terminals 2 and 3 of the processor 222 would be a potential indicator that the photocell 223 has an open-type fault.

In certain exemplary embodiments, the processor 222 uses the voltage level detected at terminal 3 to determine when to activate and deactivate the light source 210. Thus, the processor 222 operates the light source 210 based on the level of ambient light detected by the photocell 223. In one example, the processor 222 compares the detected voltage level to one or more voltage thresholds to determine when to activate and deactivate the light source 210. If the resistance of the photocell 223 is high resulting from low ambient light, then the voltage at terminal 3 of the processor 222 will be low. If the voltage at terminal 3 is lower than an activation threshold, the processor 222 activates the relay 221 to provide power to the light source 210. Similarly, if the resistance of the photocell 223 is low resulting from an abundance of ambient light, then the voltage at terminal 3 of the processor 222 will be high (e.g., close to +5 VDC). If the voltage at terminal 3 is higher than a deactivation threshold, then the processor 222 deactivates the relay 221 to remove power from the light source 210.

The photocontroller 220 also includes a current sensing circuit 270 for detecting the amount of electrical current flowing to the light source 210. The exemplary current sensing circuit 270 includes an isolation transformer T1 for isolating the processor 222 from the line voltage provided to the light source 210 and for stepping this voltage level down to a level suitable for the processor 222. The current sensing circuit 270 also includes a rectifier D6 for converting the stepped-down voltage from an AC voltage to a DC voltage. This DC voltage is applied to the input of an opto-coupler OC1 via a capacitor C8 and a resistor R9.

The opto-coupler OC1 allows an amount of current to flow on the opto-coupler's output based on the amount of current flow at the input of the opto-coupler OC1. Thus, the current flowing on the output of the opto-coupler OC1 corresponds to the amount of current flowing to the light source 210. This current on the output of the opto-coupler OC1 is routed to terminal 6 of the processor 222 so that the processor 222 can monitor current flow to the light source 210.

In certain exemplary embodiments, the processor 222 determines whether the light source 210 is activated based on the amount of current detected at terminal 6 of the processor 222. In certain exemplary embodiments, the processor 222 compares this current level to a threshold to determine if the light source 210 is activated. In one example, the processor 222 is programmed to determine that the light source 210 is activated if the current level exceeds the threshold. In certain exemplary embodiments, the processor 222 determines that the light source 210 is activated if any current is detected at terminal 6 of the processor 222.

In one exemplary embodiment, the processor 222 detects faults in the photocontroller 220 by comparing the state of the light source 210 (e.g., on or off) to the state that the light source 210 should be in based on the amount of ambient light detected by the photocell 223. If the light source 210 is activated (as determined by current flow at terminal 6) although there is sufficient ambient light (as determined by the voltage level at terminal 3), the processor 222 determines that a fault is present in the photocontroller 220. For example, the contacts of the relay 221 may be shorted, welded closed, or otherwise erroneously in a position that allows current to flow to the light source 210. If the light source 210 is deactivated although there is an insufficient amount of ambient light, the processor 222 also may determine that a fault is present in the photocontroller 220. For example, the contacts of the relay 221 may be held open, or the photocell 223 may be inoperative.

Terminal 6 of the processor 222 is electrically coupled to an LED 230 for indicating when a fault is present. In one example, the processor 222 activates (or deactivates) the LED 230 when the processor 222 determines that a fault is present. In addition or in the alternative, the processor 222 is connected to another type of fault indicator, such as a speaker. In a speaker embodiment, the processor 222 may transmit a tone to the speaker to indicate that a fault is present.

The processor 222 latches the fault indication in so that, even if the fault clears, an indication that the fault has occurred remains, providing an opportunity for a person to become aware of the fault. For example, in a situation where the light source 210 is held in an activated state continuously during the day and night irregardless of the level of ambient light and the processor 222 is programmed to only activate the light source 210 at night when the level of ambient light is low, then the processor 222 would indicate a fault during the day. However, this fault would clear at night as the level of ambient light decreases and the light source 210 should be activated. If the area is not occupied during the day and the fault it not latched in, a person may not become aware of the fault. By continuing the fault notification even after the fault clears, there is an increased likelihood that the fault indication will be noticed and any potential issues corrected in a quicker manner.

In certain exemplary embodiments, the processor 222 also monitors for faults related to the photocell 223. In certain examples, the processor 222 includes threshold values for normal photocell operation, based on ambient light conditions, that establish a range of voltages within which proper photocell operation occurs. If the processor 222 detects a voltage value outside of this range, the processor 222 determines that a photocell 223 fault has occurred and activates the LED 230. Alternatively, the photocontroller 220 can include a second LED (not shown) or other type of fault indicator for indicating that a fault in the photocell 223 has occurred.

In alternative exemplary embodiments, the photocontroller 220 also includes a second, capped photocell (not shown). A capped photocell has a cap or other light blocking element attached over the photocell such that the capped photocell continuously provides an indication of a low light condition. The processor 222 compares the states (i.e., whether the photocell detects a certain amount of ambient light) of photocell 223 and the uncapped photocell at predefined intervals to determine whether the photocell 223 is operating properly. For example, if the photocell 223 does not change states over a 24 hour period, the processor 222 determines that the photocell 223 is faulty and activate the LED 230.

Figure 3:
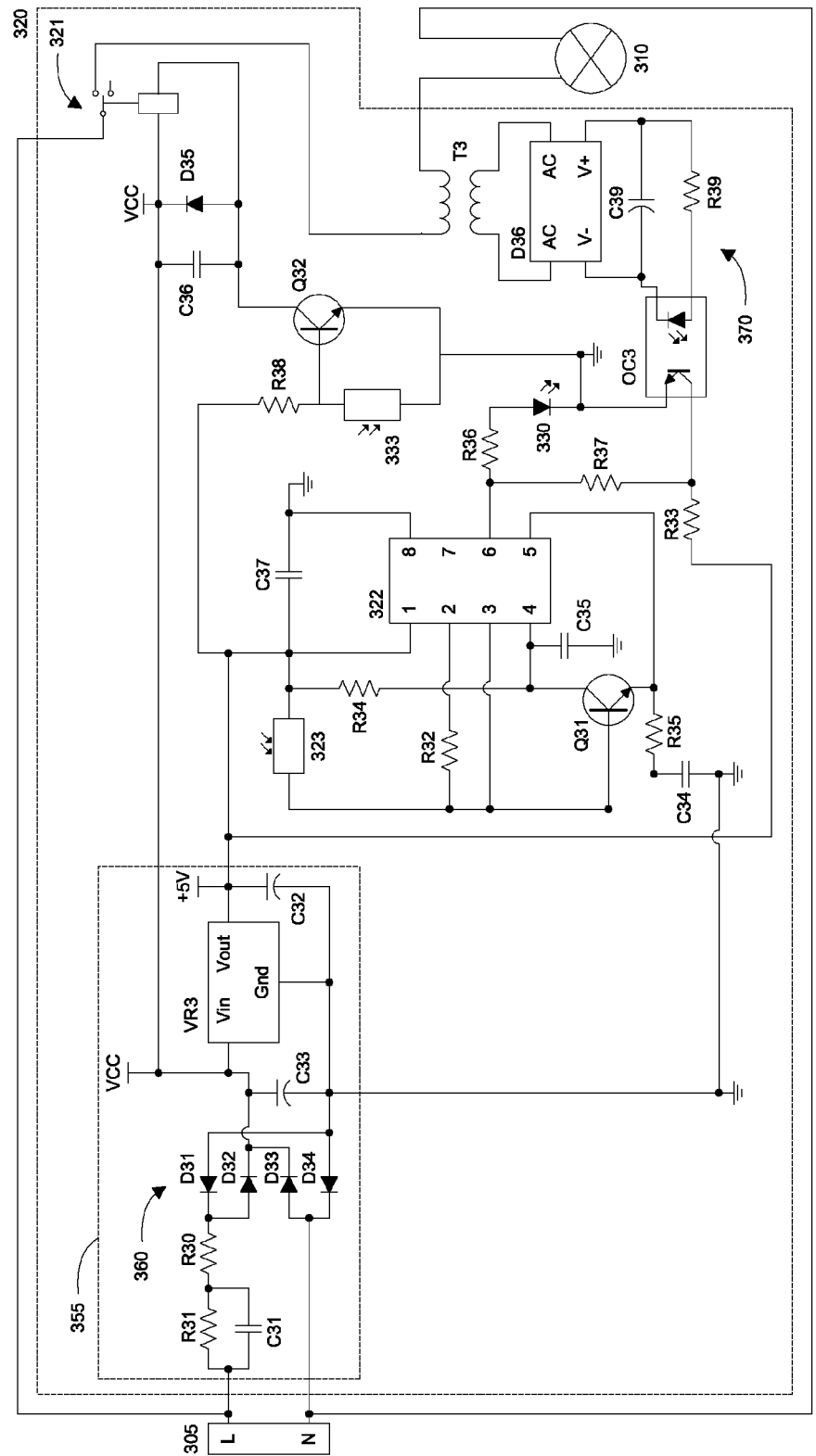
FIG. 3 is a circuit diagram of a lighting circuit with photocontrol and fault detection capabilities, in accordance with certain exemplary embodiments.

FIG. 3 is a circuit diagram of a lighting circuit 300 with photocontrol and fault detection capabilities, in accordance with certain exemplary embodiments. Referring to FIG. 3, the exemplary lighting circuit 300 includes a power source 305, a light source 310, and a photocontroller 320. The lighting circuit 300 is similar to the lighting circuit 200 of FIG. 2, excepting a portion of the photocontroller 320 as described below. In particular, the alternative exemplary embodiment of the photocontroller 320 includes a second photocell 333 for operating a relay 321 for selectively providing power to the light source 310 rather than using a processor. The exemplary photocontroller 320 includes a processor 322, which can be the same or substantially similar to that of the processor 222 of FIG. 2. However, the processor 322 performs fault monitoring functions of the photocontroller 320 while the second photocell 333 operates the relay 321.

The processor 322 monitors the level of ambient light in an area where the light source 310 is installed or otherwise located using a voltage divider network having a photocell 323 similar to the way the processor 222 monitors ambient light. The processor 322 also monitors the status of the light source 310 by monitoring the level of current flowing to the light source 310 via a current sensing circuit 370. The exemplary current sensing circuit 370 is the same or similar to the current sensing circuit 270. For example, the current sensing circuit 270 includes a transformer T3, a rectifier D36, and an opto-coupler OC3. In one exemplary embodiment, the processor 322 compares the status of the light source 310 to the monitored level of ambient light to determine is a fault is present in the photocontroller 320.

The photocell 333 controls the relay 321 by selectively allowing and blocking current flow to a coil of the relay 321 via a transistor Q32. A voltage divider network, including the photocell 333 and a resistor R38, is used to bias the transistor Q32 based on the amount of light detected by the photocell 333. The transistor Q32 is turned on or activated to allow current flow to the relay's coil by providing a sufficient level of voltage at the base of the transistor Q32. In the exemplary embodiment of FIG. 3, the resistance of the photocell 333 controls this base voltage. For example, if the photocell 333 detects little or no light, the resistance of the photocell 333 is high and thus the voltage at the base of the transistor Q32 is high turning on the transistor Q32. If the photocell 333 detects an abundance of light, the resistance of the photocell 333 is low and thus the voltage at the base of the transistor Q32 is low shutting off the transistor Q32.

Figure 4:
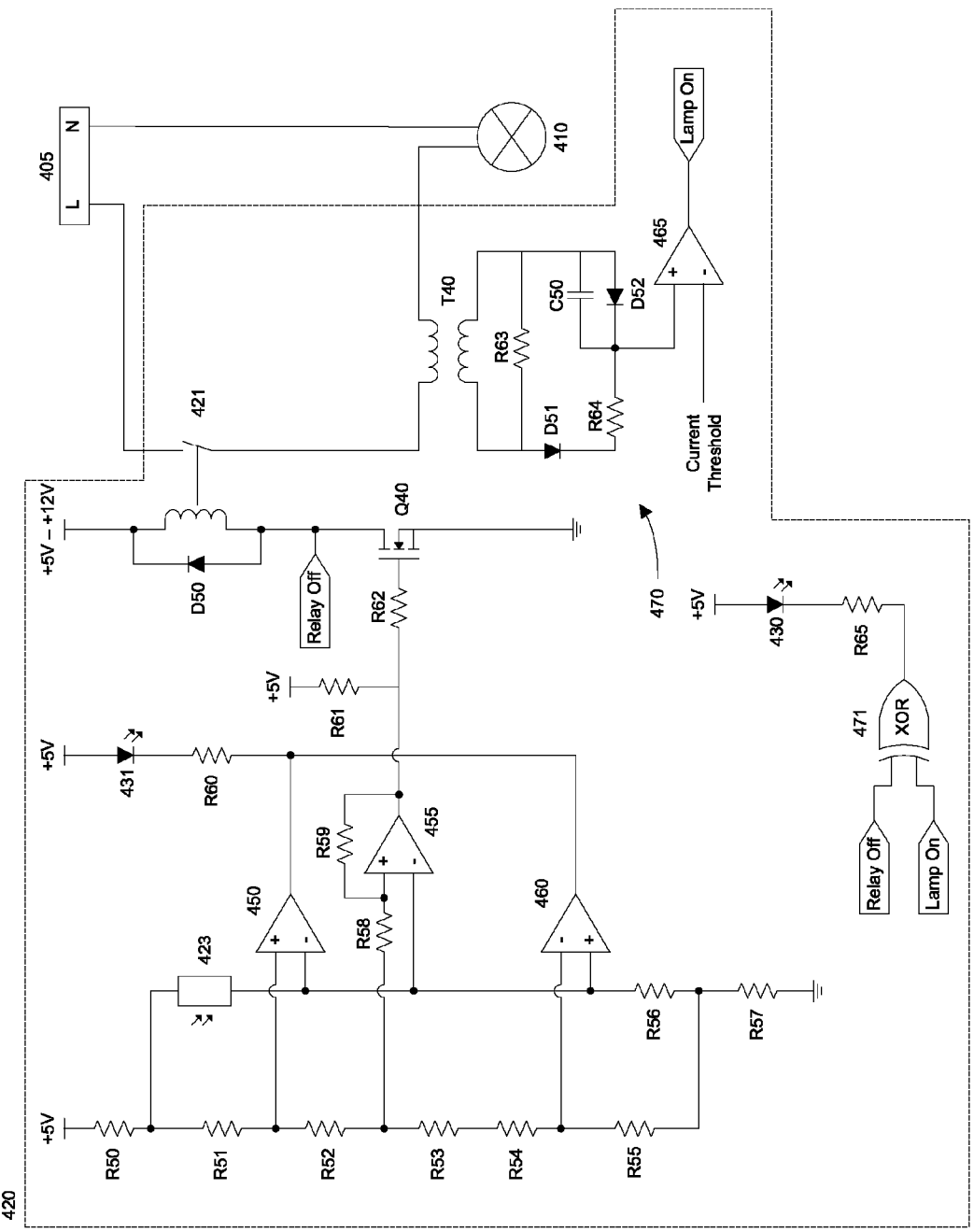
FIG. 4 is a circuit diagram of a lighting circuit with photocontrol and fault detection capabilities, in accordance with certain exemplary embodiments.

FIG. 4 is a circuit diagram of a lighting circuit 400 with photocontrol and fault detection capabilities, in accordance with certain exemplary embodiments. Referring to FIG. 4, the exemplary lighting circuit 400 includes a power source 405 for providing power to a light source 410 via a photocontroller 420. The exemplary photocontroller 420 selectively provides electrical power from the power source 405 to the light source 410 based on ambient light. Although not shown, in one exemplary embodiment, the light source 410 includes a GU24 CFL and a ballast or a self-ballasted CFL. The GU24 CFL is powered by a 120 VAC power source 405, such as those provided in a residential or commercial installation.

The photocontroller 420 includes a relay 421 disposed between a line node of the power source 405 and the light source 410. The relay 421 opens or closes the circuit between the power source 405 and the light source 410 to selectively provide power to the light source 410. The relay 421 is operated by a photocontroller 420 that includes, for example, a photocell 423, an op-amp based voltage comparator 455, a transistor Q40, and associated resistors R50-R61.

The voltage comparator 455 includes a non-inverting input designated by a "+" symbol and an inverting input designated by a "−" symbol. The comparator 455 compares the voltage level at the non-inverting input to the voltage level at the inverting input and outputs a "high signal" (e.g., approximately +5 VDC) if the voltage level at the non-inverting input is greater than the voltage level at the inverting input. If the voltage level at the non-inverting input is not greater than the voltage level at the inverting input, then the comparator outputs a "low signal" (e.g., close to 0 VDC). The output of the comparator 455 is used to activate or deactivate the transistor Q40 to allow or block the flow of current to the relay's coil. That is, if the comparator 455 outputs a high signal, such as +5 VDC, then the transistor Q40 is activated and current is allowed to flow to the relay's coil and close the relay's contacts to activate the light source 410. If the comparator 455 outputs a low signal, the transistor Q40 is deactivated and current is not allowed to flow to the relay's coil, thus opening the relay's contacts and deactivating the light source 410.

The photocell 423 is disposed in a voltage divider network with resistors R50 and R56-R57 to provide a voltage level at the non-inverting input of the comparator 455. In this configuration, the light detected by the photocell 423 can control the voltage level at the non-inverting input of the comparator 455. As described above, the resistance of the photocell 423 varies based on the amount of light detected by the photocell 423. If little or no light is detected by the photocell 423, then the resistance of the photocell 423 is high causing a lower voltage level at the non-inverting input of the comparator 455. If an abundance of light is detected by the photocell 423, then the resistance of the photocell 423 is low causing a higher voltage level at the non-inverting input of the comparator 455.

The comparator 455 compares the voltage at the non-inverting input to a reference voltage provided at the inverting input to determine whether to output a high signal to activate the light source 410. In other words, the light detected by the photocell 423 and a reference voltage are used to control the light source 410. This reference voltage is controlled by a voltage divider network that includes resistors R50-R55 and R57. The reference voltage can be adjusted to change the amount of ambient light for which the light source 410 is activated by adjusting the resistance of one or more of the resistors R50-R55 and R57. For example, if the resistance of resistors R53 and R54 are decreased, then the reference voltage is increased. The effect of this would be that the light source 410 is activated for higher ambient light conditions. Similarly, the resistance of resistors R53 and R54 can be reduced to require less ambient light before the light source 410 is activated. In certain exemplary embodiments, one or more of the resistors R51-R55 and R57 are replaced with a potentiometer. The use of a potentiometer would allow a person to more readily adjust the amount of ambient light that triggers the light source 410. In one example, resistors R53 and R54 are replaced with a single potentiometer. The exemplary potentiometer includes a rotary or sliding adjuster accessible and manually adjustable by a person, for example on the outside of a light fixture.

The photocontroller 420 also includes two voltage comparators 450 and 460 for detecting photocell 423 faults. In particular, the comparator 450 monitors for an electrical short in the photocell 423 and the comparator 460 monitors for an open circuit in the photocell 423. The output of each comparator 450 and 460 is electrically coupled to a photocell fault indicating LED 431 by one or more electrical conductors.

In one exemplary embodiment, the comparator 450 compares a voltage level downstream from the photocell 450 to a high voltage threshold to determine if the photocell 423 has a short. If the high threshold voltage is lower than the voltage downstream of the photocell 423, then the comparator 450 outputs a low signal (e.g., ~0 VDC) to activate the LED 431 and indicate that a fault is present. Similarly, the comparator 460 compares a voltage downstream from the photocell 423 to a low voltage threshold to determine whether the photocell 423 has an open circuit. If the low threshold voltage is higher than the voltage downstream from the photocell 423, then the comparator outputs a low signal to activate the LED 431 and indicate that a fault is present. In certain alternative embodiments, the output of each comparator 450 and 460 is coupled to a designated fault indicator, such as an LED or speaker, to indicate which of the two faults are present. Thus, in certain exemplary embodiments, the lighting system 400 includes two photocell faults indicators, one for a short-type fault and one for a open-type fault.

The photocontroller 420 also includes a current sensing circuit 470 for determining the status of the light source 410. The exemplary current sensing circuit 470 includes a transformer T40, diodes D51 and D52, resistors R63 and R64, a capacitor C50, and a voltage comparator 465. The transformer T40 is disposed in the lighting circuit 400 between the power source 405 and the light source 410 to provide a signal to the voltage comparator 465 indicative of the amount of current flowing to the light source 410. The comparator 465 compares this signal provided by the transformer T40 to a voltage indicative of a minimum current threshold to determine whether the light source 410 is activated.

The photocontroller 420 also includes a logic circuit having an XOR gate 471 for determining whether the photocontroller 420 has a fault that causes the light source 410 to be activated or deactivated incorrectly. In one example, the photocontroller 420 has a fault that activates the light source 410 even though the level of ambient light is sufficient to deactivate the relay 421 and the light source 410. In another example, the photocontroller 420 has a fault that deactivates the light source 410 even though the level of ambient light is insufficient. The XOR gate 471 compares the status of the relay 421 (i.e., whether or not an activation signal is provided to the relay 421) to the status of the light source 410 (e.g., whether or not current is flowing to the light source 410). If the relay 421 is off while the light source 410 is on, then a fault exists and is indicated by a fault indicating LED 430 or other fault indicating device. Also, if the relay 421 is on while the light source 410 is off, then a fault exists and the LED 430 or other fault indicating device is activated.

Figure 8:
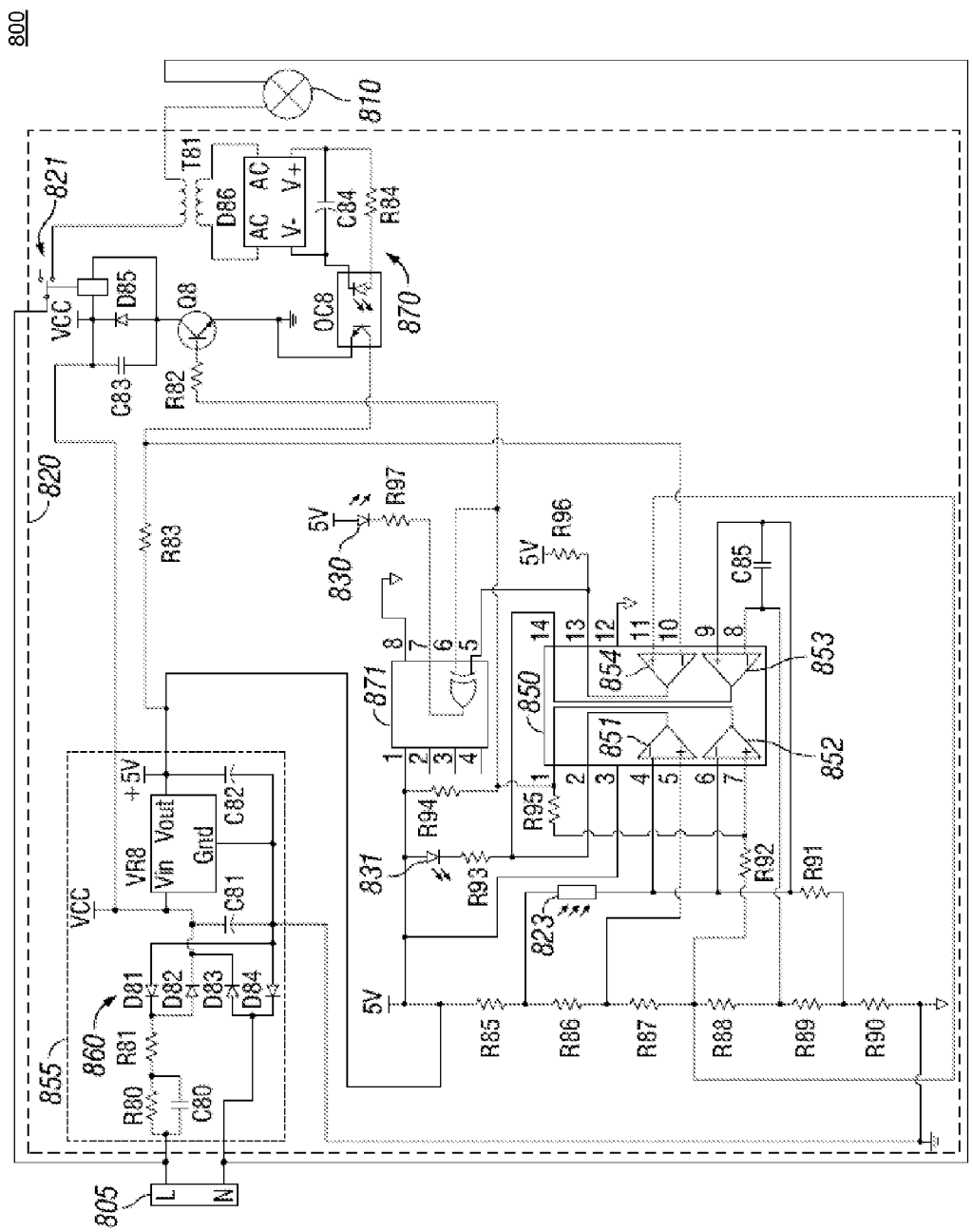
FIG. 8 is a circuit diagram of a lighting circuit with photocontrol and fault detection capabilities, in accordance with certain exemplary embodiments.

FIG. 8 is a circuit diagram of a lighting circuit 800 with photocontrol and fault capabilities, in accordance with certain exemplary embodiments. Referring to FIG. 8, the exemplary lighting circuit 800 includes a power source 805 for providing power to a light source 810 (e.g., GU24 CFL) via a photocontroller 820. The exemplary photocontroller 820 is similar to the photocontroller 420 illustrated in FIG. 4 and discussed above. In particular, the photocontroller 820 includes voltage comparators 851, 852, 853, and 854 embodied in an integrated circuit ("IC") and that perform the same functions as voltage comparators 450, 455, 460, and 465, respectively. That is, the comparator 852 operates a relay 821 via a transistor Q8 to selectively provide power to the light source 810 based on ambient light. The comparator 852 compares a voltage level that is adjusted by a photocell 823 based on the level of ambient light to a reference voltage determined by a voltage divider network including resistors R85-R90 to determine whether to activate or deactivate the light source 810.

The voltage comparators 851 and 853 are used to monitor for photocell faults similar to the comparators 450 and 460 illustrated in FIG. 4. The comparator 851 compares a voltage level downstream from the photocell 823 to a high voltage threshold to determine of the photocell 823 has an electrical short. The comparator 853 compares a voltage downstream from the photocell 823 to a low voltage threshold to determine whether the photocell 823 has an open circuit. If either comparator 851 or 853 detects a fault, then the comparator 851 or 853 outputs a low signal (e.g., ~0 VDC) to activate a fault indicating LED 831.

The photocontroller 820 also includes an XOR gate 871 embodied in an IC for performing the same fault detecting function as the XOR gate 471 illustrated in FIG. 4. That is, the XOR gate 871 determined whether the photocontroller 820 has a fault that causes the light source 810 to be activated or deactivated incorrectly. The exemplary XOR gate 871 compares the status of the relay 821 (i.e., whether or not an activation signal is provided to the relay 821) to the status of the light source 810 (e.g., whether or not current is flowing to the light source 810). If the relay 821 is off while the light source 810 is on, then a fault exists and is indicated by a fault indicating LED 830 or other fault indicating device. Also, if the relay 821 is on while the light source 810 is off, then a faults exists and the LED 830 or other fault indicating device is activated.

Figure 9:
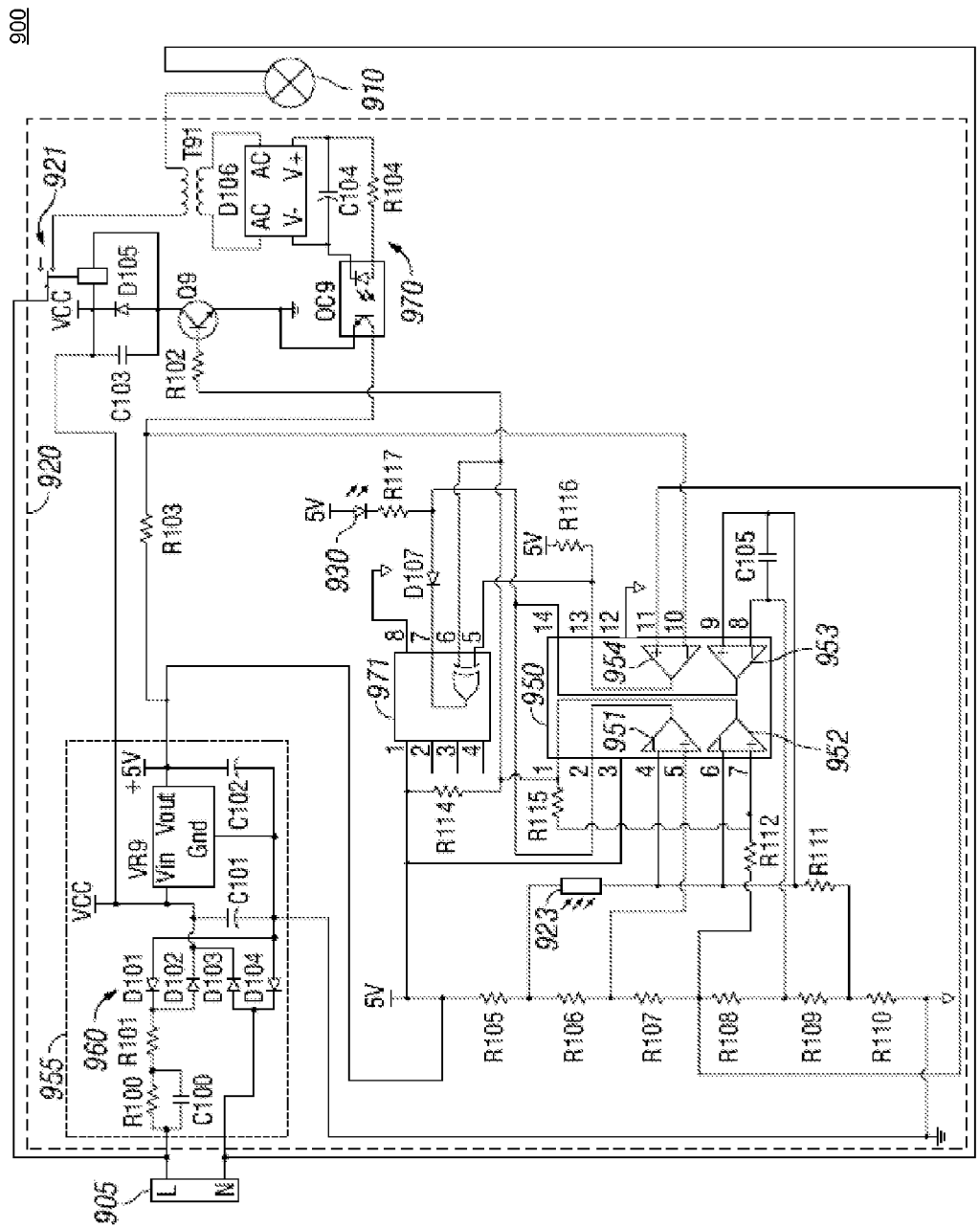
FIG. 9 is a circuit diagram of a lighting circuit with photocontrol and fault detection capabilities, in accordance with certain exemplary embodiments.

FIG. 9 is a circuit diagram of a lighting circuit 900 with photocontrol and fault capabilities, in accordance with certain exemplary embodiments. The exemplary lighting circuit 900 is similar to the circuit 800 and includes many of the same components, including a power source 905, a light source 910, and a photocontroller 920 that can be the same or substantially similar to the power source 810, the light source 810, and the photocontroller 820 illustrated in FIG. 8. However, the exemplary photocontroller 920 includes a single fault indicating LED 930 rather than two fault indicating LEDS 830 and 831.

As shown in FIG. 9, the LED 930 is connected to the output of an XOR gate 971 and to the output of two comparators 951 and 953 via a diode D107. The XOR gate 971 is used to determine whether the photocontroller 920 has a fault that causes the light source 910 to be activated or deactivated incorrectly, similar to the XOR gate 871. Similarly, the comparators 951 and 953 are used to determine whether a photocell 923 of the photocontroller 920 has an electrical short or open circuit, respectively. If the XOR gate 971 or either comparator 951 or 951 detects a fault, then the LED 930 is activated.

Figure 5:
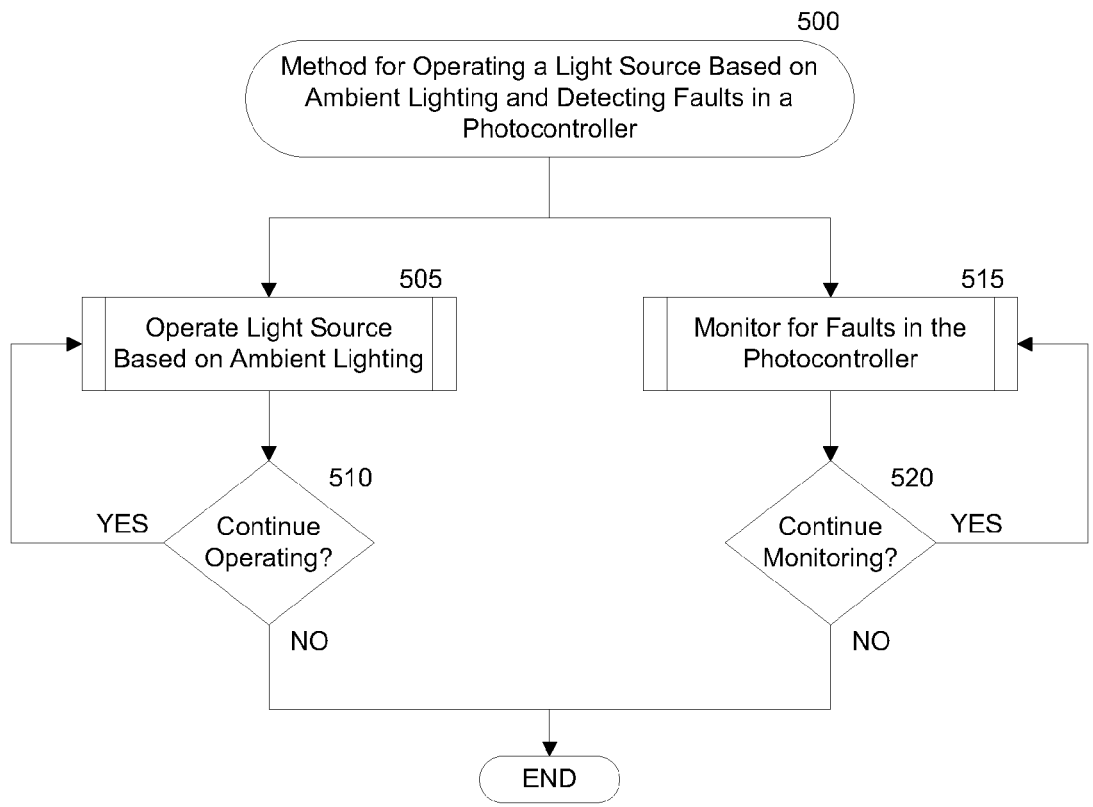
FIG. 5 is a flow chart illustrating a method for operating a light source based on ambient light and detecting faults in a photocontroller, in accordance with certain exemplary embodiments.

FIG. 5 is a flow chart illustrating a method 500 for operating a light source based on ambient light and detecting faults in a photocontroller in accordance with certain exemplary embodiments. The exemplary method 500 will be described with reference to FIGS. 1 and 5. However, one of ordinary skill in the art having the benefit of the present disclosure would readily recognize that the method 500 could be performed by each of the circuits 200, 300, 400, 800, and 900 of FIGS. 2, 3, 4, 8, and 9, respectively.

In step 505, a photocontroller 120 operates a light source 110 based on ambient light in the area where the light source 110 is located. When the level of ambient light is low, such as at night, the photocontroller 120 activates the light source 110 to provide lighting in the area. When the level of ambient light is high, such as during the day, the photocontroller 120 deactivates the light source 110 to conserve energy. Step 505 will be described in further detail below with reference to FIG. 6. In step 510, an inquiry is conducted to determine if the photocontroller 120 continues to operate. In one exemplary embodiment, this determination is made by the photocontrol circuit 122. For example, with reference to FIG. 3, a processor 322 may be programmed to make this determination. If the photocontroller 120 continues to operate, the "YES" branch returns to step 505. Otherwise, the "NO" branch is followed and the method 500 ends.

In step 515, a fault detection circuit 124 of the photocontroller 120 monitors for fault conditions. The fault detection circuit 124 can periodically or continuously monitor the level of ambient light and whether power is being provided to the light source 110. The fault detection circuit 124 compares these two states to determine whether there is a fault in the photocontroller 120. Step 515 will be described in further detail below with reference to FIG. 7. In step 520, an inquiry is conducted to determine if the fault monitoring circuit 124 should continue monitoring for faults. In one exemplary embodiment, this determination is made by the photocontrol circuit 122. For example, with reference to FIG. 3, a processor 322 may be programmed to make this determination. If the fault monitoring circuit 124 should continue monitoring for faults, the "YES" branch is followed back to step 515. Otherwise, the "NO" branch is followed and the method 500 ends.

Figure 6:
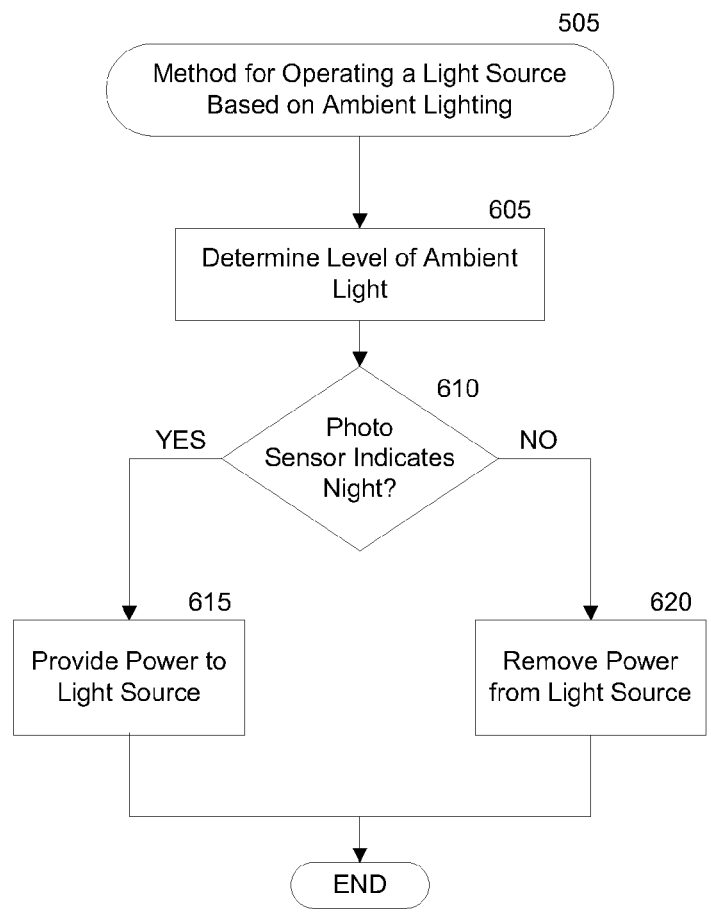
FIG. 6 is a flow chart illustrating a method for operating a light source based on ambient light, in accordance with certain exemplary embodiments.

FIG. 6 is a flow chart illustrating the exemplary method 505 of FIG. 5 for operating a light source 110 based on ambient light. The method 505 will be described with reference to FIGS. 1 and 6. In step 605, a photosensor 123 of the photocontroller 120 detects the level of ambient light in the area where the light source 110 is located. As described above, in one exemplary embodiment, the photosensor 123 includes a photocell, photoresistor, photodiode, phototransistor, photoFET, or any other device that can be used to sense or detect light levels. The photosensor 123 provides a signal indicative of the level of ambient light detected to a photocontrol circuit 122.

In step 610, an inquiry is conducted to determine if the photosensor 123 indicates night. In one exemplary embodiment this determination is made by the photocontrol circuit 122 determining whether the light source 110 should be activated based on the detected level of ambient light. The photocontrol circuit 122 compares the level of ambient light to one or more thresholds to determine whether to activate or deactivate the light source 110. In one example, the photosensor 123 provides a voltage level the corresponds to the level of ambient light to the photocontrol circuit 122. The photocontrol circuit 122 compares this voltage level to an activation threshold to determine whether to activate the light source 110. The photocontrol circuit 122 also compares the voltage level to a deactivation voltage level to determine whether to deactivate the light source 110. These exemplary thresholds may be the same or different. If the photocontrol circuit 122 determines that the level of ambient light corresponds to a low ambient light state (e.g., night) where the light source 110 should be activated, then the "YES" branch is followed to step 615. If the photocontrol circuit 122 determines that the level of ambient light corresponds to a sufficient ambient light state (e.g., day) where the light source 110 should not be activated, then the "NO" branch is followed to step 620.

In step 615, photocontrol circuit 122 provides power to the light source 110. For example, the photocontrol circuit 122 activates a relay 121 or other switching device disposed between a power source 105 and the light source 110 to allow current to flow to the light source 110. In step 620, the photocontrol circuit 122 removes power from the light source 110. For example, the photocontrol circuit 122 deactivates the relay to block current from flowing to the light source 110.

Figure 7:
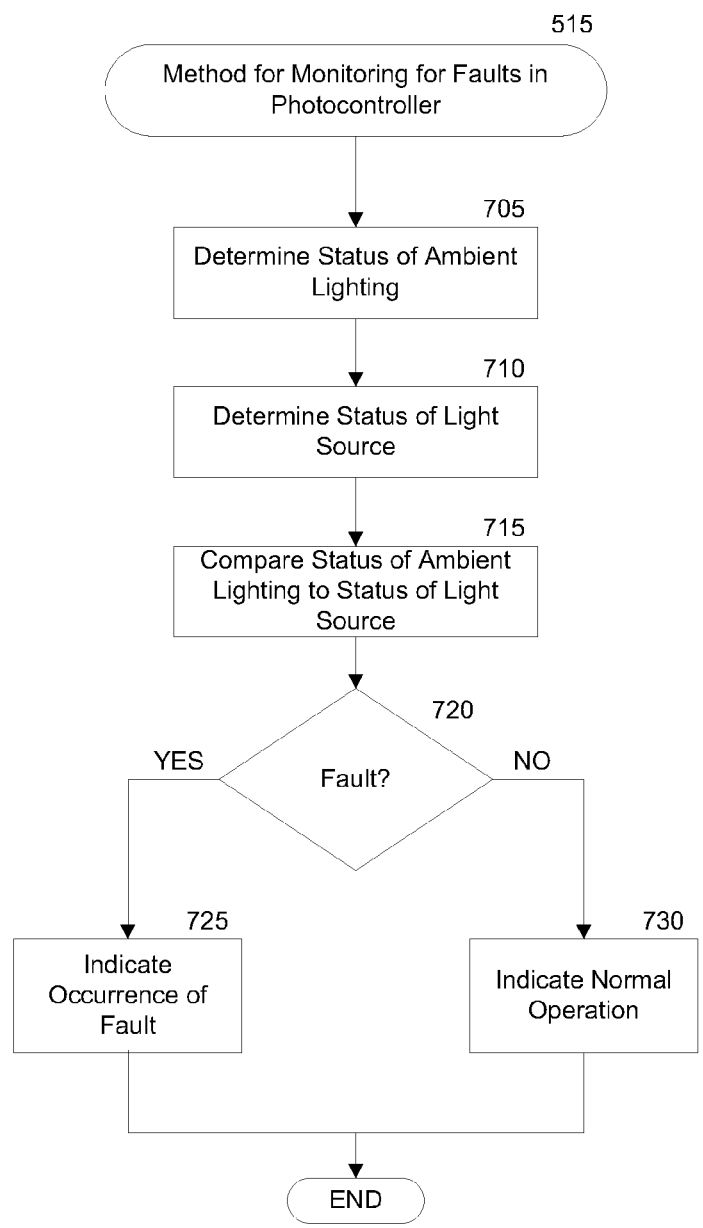
FIG. 7 is a flow chart illustrating a method for monitoring for faults in a photocontroller, in accordance with certain exemplary embodiments.

FIG. 7 is a flow chart illustrating the exemplary method 515 of FIG. 5 for monitoring for faults in a photocontroller 120. The exemplary method 515 will be described with reference to FIGS. 1 and 7. In step 705, the fault monitoring circuit 124 determines the status of ambient light in the area of the light source 110. The status may be a "low ambient light state" where the light source 110 should be activated or a "sufficient ambient light state" where the light source 110 should not be activated. The fault detection circuit 124 receives a signal from the photosensor 123 or from another photosensor (not shown) indicating the level of ambient light and compares this level to one or more thresholds to determine the status of ambient light.

In step 710, the fault detection circuit 124 determines the status of the light source 110. This light source status can include an "active status" where the light source 110 is activated and an "inactive status" where the light source 110 is not activated. For example, the fault detection circuit 124 monitors whether current is flowing to the light source 110 via a current sensor 125. The current sensor 125 provides a discrete signal indicating whether current is flowing or a signal indicating the amount of current flowing. If an amount of current is provided, the fault detection circuit 124 compares the amount of current flowing to a threshold to determine whether the light source 110 is active. Alternatively, the fault detection circuit 124 is coupled to a contact of the relay 121 that provides the status of whether the light source 124 is active. If the relay contact is closed, then the status of the light source 111 is active.

In step 715, the fault detection circuit 124 compares the status of the ambient light to the status of the light source 110 to determine if a fault is present. In certain exemplary embodiments, the fault detection circuit 124 determines that a fault is present if the status of ambient light is a low light state and the status of the light source 110 is inactive. Thus, there is a fault if the level of ambient light suggests that the light source 110 should be on but the light source 110 is off. The fault detection circuit 124 also may determine that a fault is present if the status of ambient light is a sufficient light state and the status of the light source 110 is active. Thus, there is a fault if the level of ambient light suggests that the light source 110 should be off but the light source is on.

In step 720, a fault determination is made. If a fault is detected, the "YES" branch is followed to step 725. If a fault is not detected, then the "NO" branch is followed to step 730. In step 725, the fault detection circuit 124 activates a fault indicator 130. As described above, the fault detection circuit 124 latches the fault indication to indicate the occurrence of the fault even if the fault subsequently clears. In step 730, the fault detection circuit 124 indicates normal operation by not activating the fault indicator 130.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A lighting circuit, comprising:
a photosensor for detecting ambient light levels and for generating an ambient light signal comprising an indication of the level of ambient light;
a relay disposed between a power source and a light source to selectively allow the power source to provide power to the light source;
a photocontrol circuit electrically coupled to the relay and to the photosensor, the photocontrol circuit for:
receiving the ambient light signal from the photosensor;
determining whether the level of ambient light is below an activation threshold; and
in response to the level of ambient light being below the activation threshold, causing the relay to allow power from the power source to the light source; and
a fault detection circuit for monitoring for faults in the lighting circuit by comparing whether power should be provided to the light source based on the level of ambient light and whether power is actually being provided to the light source, wherein
the ambient light signal comprises a voltage level indicative of the level of ambient light and the photocontrol circuit determines whether the level of ambient light is below an activation threshold by comparing the voltage level to a threshold voltage.

2. The lighting circuit of claim 1, wherein the photocontrol circuit:
determines whether the level of ambient light exceeds a deactivation threshold; and
in response to the level of ambient light exceeding the deactivation threshold, causing the relay to block power from the power source reaching the light source.

3. The lighting circuit of claim 1, wherein the photosensor comprises one of a photocell, a photoresistor, a photodiode, a phototransistor, or a photoFET.

4. The lighting circuit of claim 1, wherein the photocontrol circuit comprises a voltage comparator for comparing the voltage level to the threshold voltage.

5. The lighting circuit of claim 1, wherein the photocontrol circuit comprises a processor for receiving the ambient light signal from the photosensor and for providing a signal that causes the relay to allow power from the power source to the light source.

6. A lighting circuit, comprising:
a photosensor for detecting ambient light levels and for generating an ambient light signal comprising an indication of the level of ambient light;
a relay disposed between a power source and a light source to selectively allow the power source to provide power to the light source;
a photocontrol circuit electrically coupled to the relay and to the photosensor, the photocontrol circuit for:
receiving the ambient light signal from the photosensor;
determining whether the level of ambient light is below an activation threshold; and
in response to the level of ambient light being below the activation threshold, causing the relay to allow power from the power source to the light source;
a fault detection circuit for monitoring for faults in the lighting circuit by comparing whether power should be provided to the light source based on the level of ambient light and whether power is actually being provided to the light source; and
a current sensor for detecting electrical current flow to the light source and logically coupled to the fault detection circuit.

7. The lighting circuit of claim 6, wherein the fault detection circuit determines that power is actually being provided to the light source based on current flow being detected by the current sensor.

8. The lighting circuit of claim 6, wherein
the current sensor further detects a level of current flow to the light source and provides an indication of the level of current flow to the fault detection circuit, and
the fault detection circuit determines whether power is actually being provided to the light source by comparing the level of current flow to a current threshold.

9. A lighting circuit, comprising:
a photosensor for detecting ambient light levels and for generating an ambient light signal comprising an indication of the level of ambient light;
a relay disposed between a power source and a light source to selectively allow the power source to provide power to the light source;
a photocontrol circuit electrically coupled to the relay and to the photosensor, the photocontrol circuit for:
receiving the ambient light signal from the photosensor;
determining whether the level of ambient light is below an activation threshold; and
in response to the level of ambient light being below the activation threshold, causing the relay to allow power from the power source to the light source; and
a fault detection circuit for monitoring for faults in the lighting circuit by comparing whether power should be provided to the light source based on the level of ambient light and whether power is actually being provided to the light source, wherein
the fault detection circuit comprises a processor logically coupled to a second photosensor and comprising information indicating the activation threshold, and
the processor determines power should be provided to the light source by comparing a level of ambient light detected by the second photosensor to the activation threshold.

10. A lighting circuit, comprising:
a GU24 compact fluorescent lamp;
a photocontroller for selectively providing power to the lamp from a power source, the photocontroller comprising:
a relay comprising a set of relay contacts disposed between the power source and the lamp;
a photosensor for detecting ambient light levels and for generating an ambient light signal comprising an indication of the level of ambient light;
a processor for:
receiving the ambient light signal from the photosensor;
determining whether the level of ambient light exceeds a deactivation threshold;
based on a determination that the level of ambient light exceeds the deactivation threshold, providing a signal to the relay to cause the relay contacts to open and block power from reaching the lamp;
determining whether power is being provided to the lamp; and
determining that a fault exists if power is being provided to the lamp when the level of ambient light exceeds the deactivation threshold; and
one of a visual or an audible indicator logically coupled to the processor, wherein the processor activates the indicator upon determining that a fault exists.

11. The lighting circuit of claim 10, wherein the processor:
determines whether the level of ambient light exceeds an activation threshold;
based on a determination that the level of ambient light does not exceed the activation threshold, provides a signal to the relay to cause the relay contacts to close and allow power to reach the lamp; and
determines that a fault exists if power is not being provided to the lamp when the level of ambient light does not exceed the activation threshold.

12. The lighting circuit of claim 10, wherein the photosensor comprises one of a photocell, a photoresistor, a photodiode, a phototransistor, or a photoFET.

13. The lighting circuit of claim 10, wherein the ambient light signal comprises a voltage level that indicates the level of ambient light and wherein the voltage level varies with a change in the amount of ambient light detected by the photosensor.

14. The lighting circuit of claim 13, wherein the deactivation threshold comprises a deactivation voltage threshold and wherein the processor determines whether the level of ambient light exceeds the deactivation threshold by comparing the voltage level of the ambient light signal to the deactivation voltage threshold.

15. The lighting circuit of claim 14, further comprising a second capped photosensor logically coupled to the processor, wherein the processor determines that there is a fault with the photosensor for detecting ambient light levels by comparing levels of light detected by the capped photosensor to levels of ambient light detected by the photosensor for detecting ambient light levels over a period of time to determine whether the level of ambient light detected by the photosensor for detecting ambient light levels varies over time during the time period.

16. The lighting circuit of claim 10, further comprising a current sensor logically coupled to the processor for determining whether electrical current is flowing to the lamp and for transmitting a signal to the processor indicating whether current is flowing to the lamp, wherein the processor determines that power is being provided to the lamp based on a signal indicating that current is flowing to the lamp.

17. The lighting circuit of claim 10, further comprising a current sensor logically coupled to the processor for determining an amount electrical current flowing to the lamp and for transmitting a signal to the processor indicating the amount of electrical current, wherein the processor determines that power is being provided to the lamp when the amount of electrical current exceeds a threshold.

18. A lighting circuit, comprising:

a light source;

a switching mechanism disposed between the light source and a power source for allowing the power source to activate the light source upon receipt of a command signal;

a photosensor for detecting ambient light levels and for adjusting a voltage level in response to the level of ambient light detected;

a first voltage comparator having a first input for receiving the voltage level, a second input coupled to a reference voltage, and an output coupled to the switching mechanism, the first voltage comparator operable to provide the command signal to the switching mechanism in response to the voltage level indicating a low level of ambient light based on a comparison of the voltage level with the reference voltage; and a fault detection circuit for detecting a first fault condition in the lighting circuit when the command signal is not provided to the switching mechanism by the first voltage comparator and power is being provided to the light source, wherein the fault detection circuit further detects a second fault condition in the lighting circuit when the command signal is provided to the switching mechanism by the first voltage comparator and power is not being provided to the light source.

19. A lighting circuit, comprising:

a light source;

a switching mechanism disposed between the light source and a power source for allowing the power source to activate the light source upon receipt of a command signal;

a photosensor for detecting ambient light levels and for adjusting a voltage level in response to the level of ambient light detected;

a first voltage comparator having a first input for receiving the voltage level, a second input coupled to a reference voltage, and an output coupled to the switching mechanism, the first voltage comparator operable to provide the command signal to the switching mechanism in response to the voltage level indicating a low level of ambient light based on a comparison of the voltage level with the reference voltage; and a fault detection circuit for detecting a first fault condition in the lighting circuit when the command signal is not provided to the switching mechanism by the first voltage comparator and power is being provided to the light source, wherein the fault detection circuit comprises a second voltage comparator for detecting an electrical short circuit fault condition in the photosensor by comparing the voltage level to a short circuit reference voltage level.

20. A lighting circuit, comprising:

a light source;

a switching mechanism disposed between the light source and a power source for allowing the power source to activate the light source upon receipt of a command signal;

a photosensor for detecting ambient light levels and for adjusting a voltage level in response to the level of ambient light detected;

a first voltage comparator having a first input for receiving the voltage level, a second input coupled to a reference voltage, and an output coupled to the switching mechanism, the first voltage comparator operable to provide the command signal to the switching mechanism in response to the voltage level indicating a low level of ambient light based on a comparison of the voltage level with the reference voltage; and a fault detection circuit for detecting a first fault condition in the lighting circuit when the command signal is not provided to the switching mechanism by the first voltage comparator and power is being provided to the light source, wherein the fault detection circuit comprises a second voltage comparator for detecting an electrical open circuit fault condition in the photosensor by comparing the voltage level to an open circuit reference voltage level.

21. The lighting circuit of claim 18, wherein the light source comprises a self-ballasted GU24 compact fluorescent lamp.

22. The lighting circuit of claim 18, wherein the switching mechanism comprises a relay.

23. A lighting circuit, comprising:

a light source;

a switching mechanism disposed between the light source and a power source for allowing the power source to activate the light source upon receipt of a command signal;

a photosensor for detecting ambient light levels and for adjusting a voltage level in response to the level of ambient light detected;

a first voltage comparator having a first input for receiving the voltage level, a second input coupled to a reference voltage, and an output coupled to the switching mechanism, the first voltage comparator operable to provide the command signal to the switching mechanism in response to the voltage level indicating a low level of ambient light based on a comparison of the voltage level with the reference voltage; and a fault detection circuit for detecting a first fault condition in the lighting circuit when the command signal is not provided to the switching mechanism by the first voltage comparator and power is being provided to the light source, wherein the fault detection circuit comprises a current sensor for detecting electrical current flow to the light source, and the fault detection circuit determines that power is being provided to the light source in response to the current sensor detecting current flow to the light source.

24. The lighting circuit of claim 23, wherein the fault detection circuit comprises a current comparator for comparing a current level corresponding to an amount of current flowing to the light source with a threshold current to determine whether power is being provided to the light source.

25. The lighting circuit of claim 19, wherein the fault detection circuit further comprises:

a third voltage comparator for detecting an electrical open circuit fault condition in the photosensor by comparing the voltage level to an open circuit reference voltage level.

26. The lighting circuit of claim 25, further comprising a first fault indicator for indicating an occurrence of the first fault condition and a second fault indicator for indicating an occurrence of at least one of (a) an electrical short circuit fault condition in the photosensor or (b) an electrical open circuit fault condition in the photosensor.

27. The lighting circuit of claim 25, further comprising a fault indicator for indicating an occurrence of at least one of (a) the first fault condition, (b) an electrical short circuit fault condition in the photosensor, or (c) an electrical open circuit fault condition in the photosensor.

28. The lighting circuit of claim 1, wherein the light source comprises at least one Light Emitting Diode (LED).

29. The lighting circuit of claim 10, wherein the GU24 compact fluorescent lamp comprises at least one Light Emitting Diode (LED).

30. The lighting circuit of claim 18, wherein the light source comprises at least one Light Emitting Diode (LED).

* * * * *